United States Patent [19]

LaRosa

[11] Patent Number: 5,218,923
[45] Date of Patent: Jun. 15, 1993

[54] CONTAINER FOR STORAGE AND/OR SHIPMENT OF LIVE LOBSTERS

[75] Inventor: Leonardo LaRosa, Reading, Mass.

[73] Assignee: Rose Seafood Industries, Inc., Woburn, Mass.

[21] Appl. No.: 919,026

[22] Filed: Jul. 23, 1992

[51] Int. Cl.5 .................... A01K 61/00; A01K 63/02
[52] U.S. Cl. ....................................................... 119/2
[58] Field of Search .................... 119/2, 4; 43/55; 426/119

[56] References Cited

U.S. PATENT DOCUMENTS

| | | | |
|---|---|---|---|
| 1,639,555 | 8/1927 | Clark | 119/2 |
| 2,266,664 | 12/1941 | Stevens | 119/2 |
| 2,680,424 | 6/1954 | Brown | 43/55 X |
| 3,958,359 | 5/1976 | Doughty | 43/55 |
| 5,042,260 | 8/1991 | George, Sr. | 62/60 |
| 5,050,335 | 9/1991 | Hisey | 43/55 |

Primary Examiner—Robert P. Swiatek
Attorney, Agent, or Firm—Hamilton, Brook, Smith & Reynolds

[57] ABSTRACT

A storage and shipping container for live lobsters is disclosed. This container has a bottom portion containing lobster holsters to contain the tail and body portions of the lobster and support the claws of the lobster at the Merus section. An optional intermediate section provides ribs to support refrigerator gel packs or other coolant contained in an upper cover section or the container. A method for packaging live lobsters employing this container is also disclosed.

15 Claims, 5 Drawing Sheets

CONTAINER FOR STORAGE AND/OR SHIPMENT OF LIVE LOBSTERS

BACKGROUND OF THE INVENTION

For many years, there has been a large demand for live lobsters at areas distant from where the lobsters are harvested. To satisfy this demand, lobsters have been packaged and shipped great distances, including shipment by air transport.

In the past, live lobsters were simply placed in large cartons, such as cardboard cartons lined with suitable insulation, for shipment. Ice, refrigerated gel packs or other cooling means were added to lower the temperature of the lobsters during shipment. Unfortunately, many of the lobsters were damaged or died during shipment in such containers due to injury resulting from the inevitable contact and smashing together caused by handling and shipment.

An attempt to overcome such problems resulted in the shipping container described in U.S. Pat. No. 5,042,260. This container for live lobsters is a carton large enough to accommodate a plurality of live lobsters with an intersecting array of partition walls introduced into the container to subdivide its interior into a plurality of compartments. Each compartment is configured to receive a single live lobster.

SUMMARY OF THE INVENTION

The present invention relates to a storage and/or shipment container for live lobsters. The container of this invention comprises a bottom section having therein a plurality of lobster holsters, each of which is suitable for containing the body and tail of a single lobster in a manner which supports and claws of the lobster at the elbow or Merus section. The container also has an upper cover section with an interior void volume suitable for containing a cooling means, such as refrigerator gel packs, for lobsters contained in holsters within the bottom section of the container. Optionally, an intermediate section is employed which has means for supporting the cooling means for lobsters contained within the cover section of the container. The bottom, upper and intermediate sections of the container are formed from a thermally insulating material, such as foamed polystyrene. In a preferred embodiment, each section is a molded unitary section. The sections also have means for joining them together into an integral storage and/or shipment container for live lobsters.

The invention also relates to a method for packaging live lobsters for shipment by providing the aforementioned container; joining the intermediate section to the lower section; introducing lobsters into the holsters of the bottom section of the container; adding cooling means on the top of the intermediate section; and joining the cover section to the intermediate section.

The storage and shipment container described and claimed herein provides many advantages for the packaging, storage and/or shipment of live lobsters. It is a very robust container which can withstand high impact and protects the lobsters over long periods of time in extreme temperature conditions. Because of its integral construction from thermally insulating material, it requires less ice or refrigerated gel packs than has heretofore been required, thereby improving the ratio of net to gross weight. This is a particular advantage for air shipment.

This container can be used for a wide range of lobster sizes or, for that matter, mixtures of different sizes.

Importantly, lobsters are suspended at the elbow or Merus region of their claws while their bodies are surrounded by snug-fitting lobster holsters. These holsters provide shock protection, hold the lobsters snugly in place in the event the box is tipped and provide supplemental thermal insulation to each individual lobster in addition to that provided by the outside walls of the container. Suspending the lobsters in this manner allows the lobsters to spread their claws. The open claws provide access to the gill portions of the lobsters so that introduction of moisture and lower temperatures from the cooling means located thereabove into the gills during shipment is facilitated.

DETAILED DESCRIPTION OF THE INVENTION

The above features and other details of the container and method of this invention will now be more particularly described with reference to the accompanying drawings and pointed out in the claims. The same number present in different figures represents the same item. It will be understood that the particular embodiments of the invention are shown by way of illustration and not as limitations of the invention. The principle features of this invention can be employed in various embodiments without departing from the scope of the invention.

Figure 1:
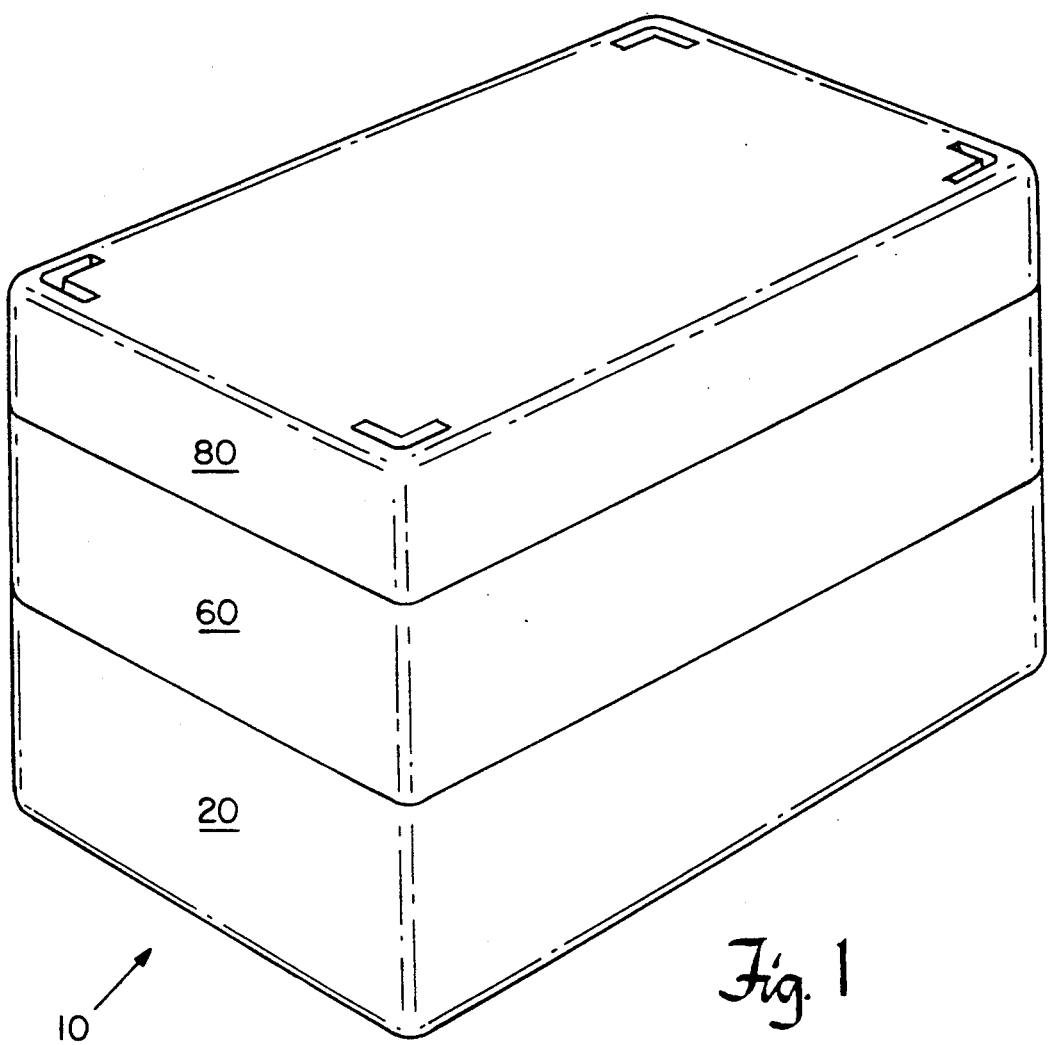
FIG. 1 is a perspective view of an assembled storage and/or shipment container for live lobsters according to this invention.
Figure 8:
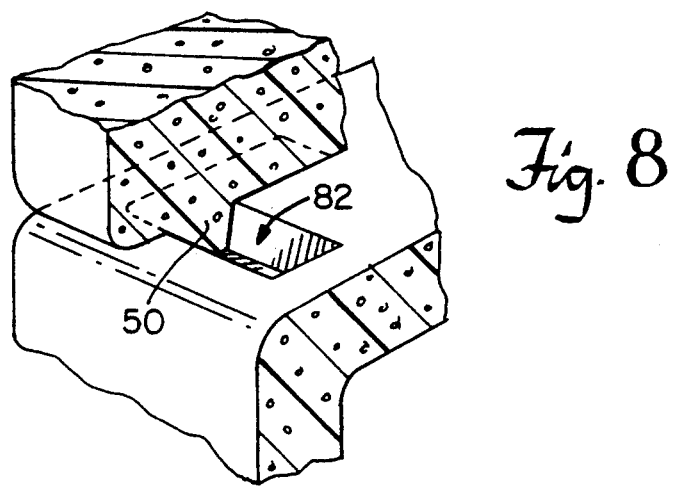
FIG. 8 is a partial perspective view showing the detail of the mating female and male lugs on the container to facilitate stacking of such containers.

FIG. 1 illustrates a container 10 for storage and/or shipment of live lobsters according this invention. Container 10 has a bottom portion 20, an intermediate portion 60 and an upper portion 80.

As illustrated, container 10 has a rectangular shape. An example of suitable dimensions for such a rectangular container, which could contain up to 21 live lobsters, as described herein, is a container having a length of 25¾", a width of 13¾" and a height of 14¼". Other shapes and/or dimensions, of course, can be employed.

Container 10 is formed of a material which provides structural strength and thermal insulation. Further, the material must maintain both of these properties when container 10 is subjected to water, humidity and rough handling. Although a wide variety of materials can be employed, foamed polymers, such as polystyrene or polyurethane, are preferred, because of their combination of strength and thermal insulation.

When such foamed polymers are employed, lower portion 20, intermediate portion 60 and upper portion 80 can be molded as unitary structures. These molded sections can be assembled, as illustrated, providing only two joints between the three segments. Further, interlocks can be provided to form strong mechanical locks between the sections thereby creating one integral watertight container that cannot be unintentionally separated.

Figure 2:
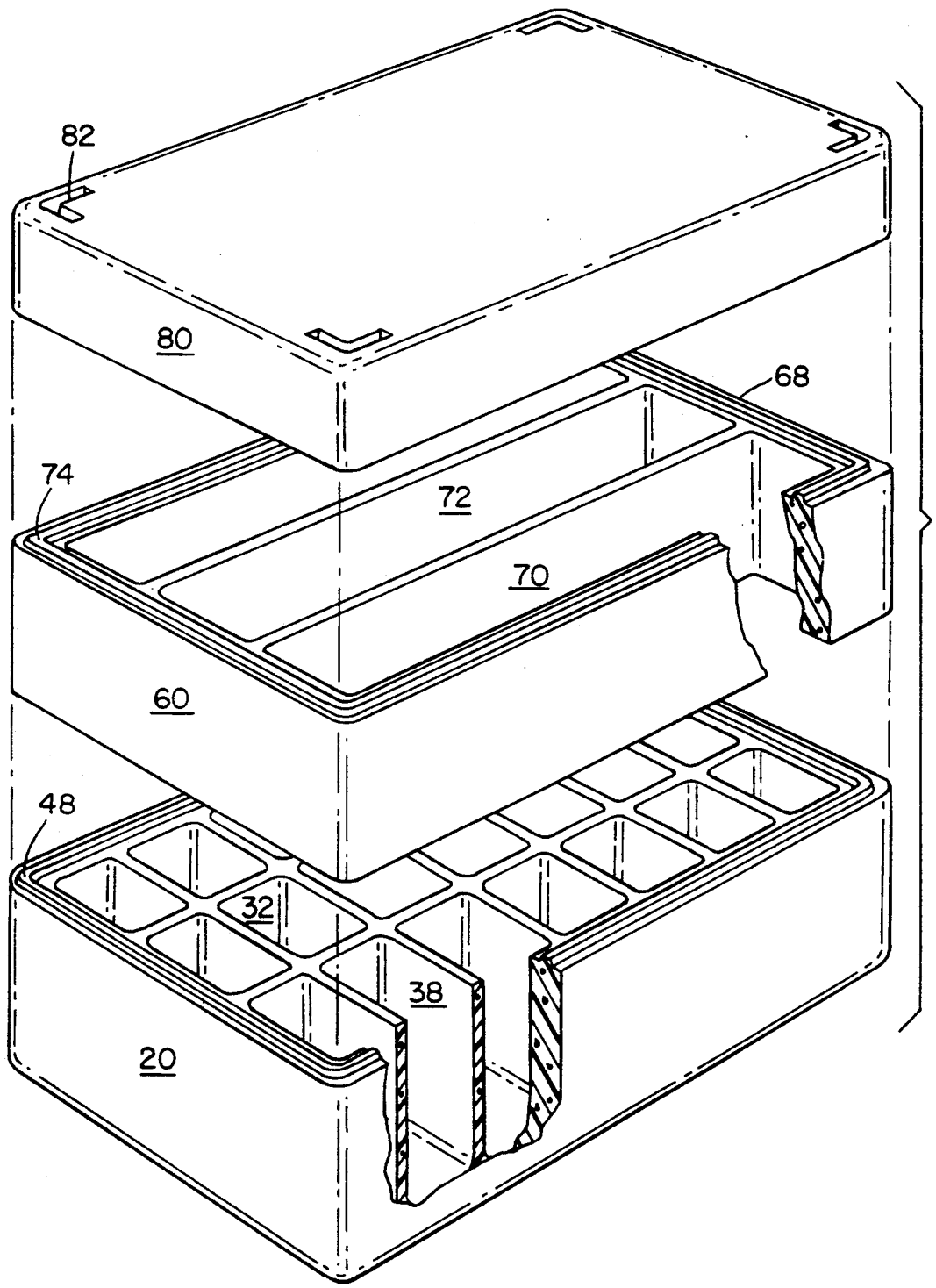
FIG. 2 is an exploded view, partially broken away, further illustrating the bottom, upper and intermediate sections of the container.
Figure 3:
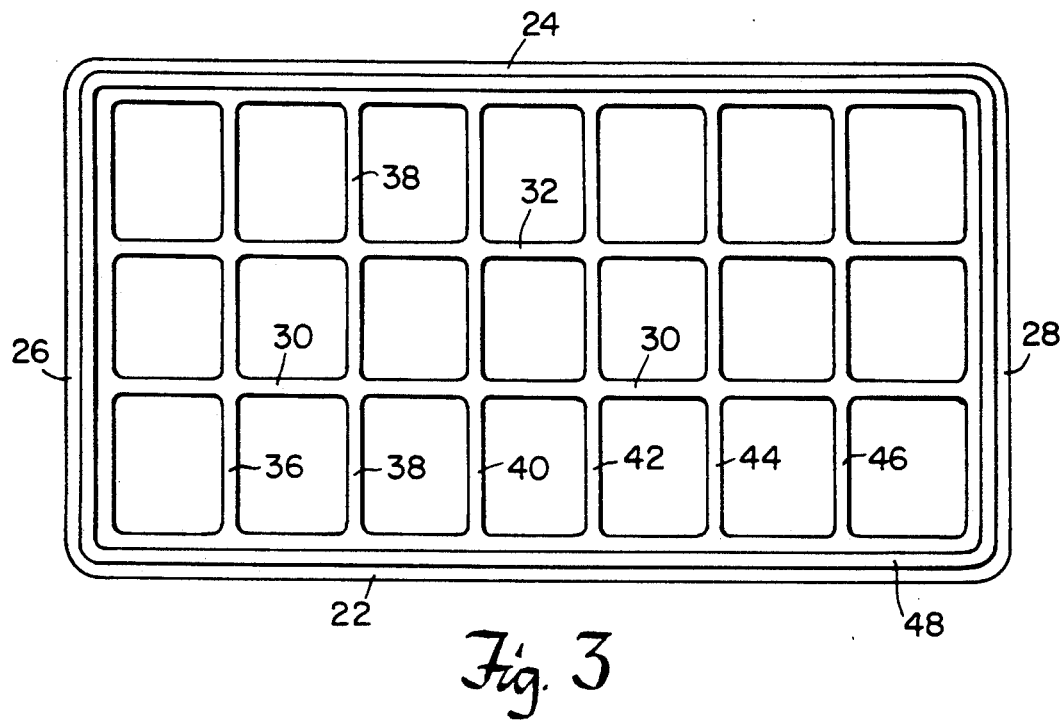
FIG. 3 is a plan view of the bottom section of the container.
Figure 4:
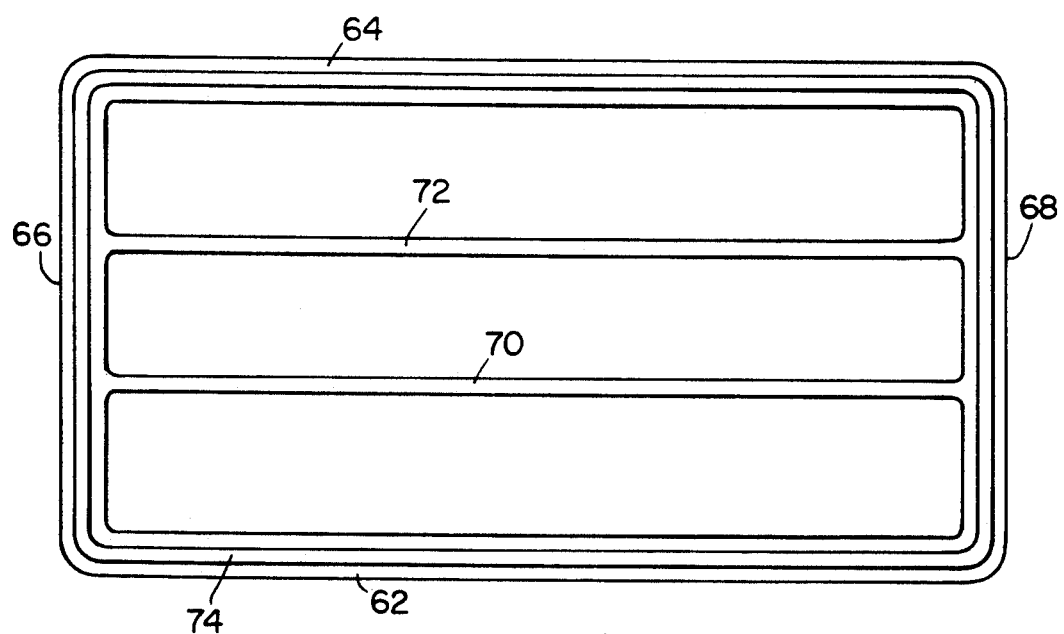
FIG. 4 is a plan view of the intermediate section of the container.

The construction of bottom portion 20 is illustrated in FIGS. 2 and 3. As shown, bottom portion 20 has relatively thick front and back walls 22 and 24, respectively; side walls 26 and 28; and bottom wall (not shown). Such relatively thick outer and bottom walls are desired to provide structural integrity and thermal insulation to container 10.

Thinner but still structurally strong internal walls 30 and 32 run lengthwise along the internal portion of bottom section 20 whereas similar walls 36, 38, 40, 42, 44, and 46 traverse the width of interior of bottom portion 20. These internal walls are present in a parallel and equally spaced relationship to each other. This relationship of internal wall members segregates bottom portion 20 into 21 lobster holders, each suited to support one individual live lobster. Of course, the internal walls could be spaced with varying distances between them to provide lobster holsters of different sizes.

The male portion of an interlock between bottom section 20 and intermediate section 60 runs along the upper perimeter of the upper portion of the bottom section 20. Stacking lugs 50 are located at the four bottom corners of lower section 20. Fewer or more stacking lugs could be employed, of course.

Figure 7:
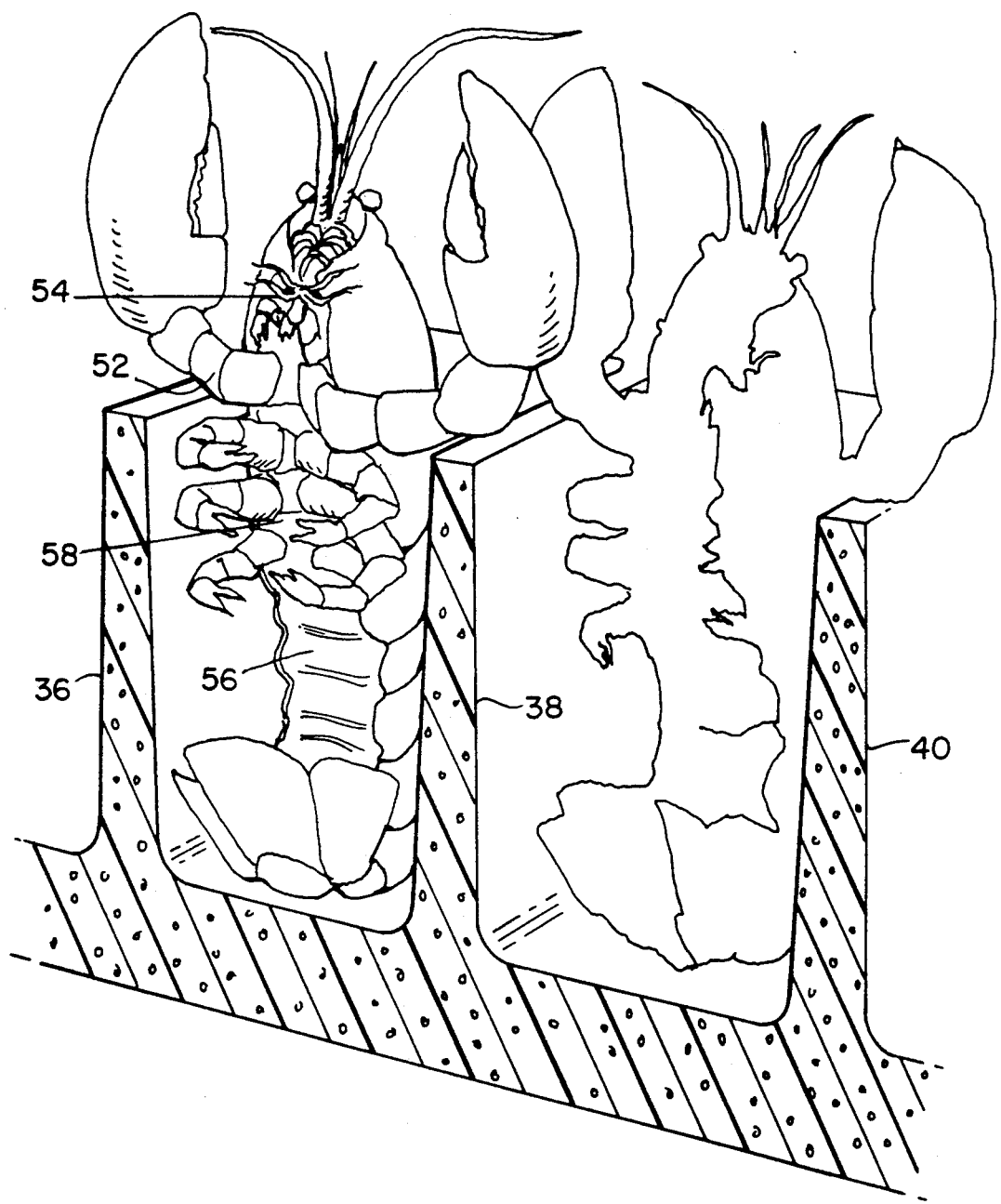
FIG. 7 is a partial perspective view of lobsters contained within holsters in the bottom section of the container.

The manner in which the lobster holsters of lower section 20 support individual live lobsters is illustrated in FIG. 7. Therein, it can be seen that the height of internal walls 36, 38 and 40 is selected to support the claws of live lobsters at the elbow or Merus section 52 leaving the gill section 54 unobstructed so that cool moisture can pass in an unobstructed manner to gill section 54.

Tail 56 and body section 58 of a live lobster fit snugly into each of the lobster holsters created by the internal wall sections of bottom portion 20 of container 10.

Intermediate section 60 is formed from relatively thick front and back outer walls 62 and 64, respectively, and relatively thick side walls 66 and 68. Internally, intermediate section 60 contains two thinner but still relatively strong ribs 70 and 72 which traverse the intermediate section 60 lengthwise. Ribs 70 and 72 provide support for cooling means for live lobsters, such as refrigerator gel packs or ice. Additionally, ribs 70 and 72 help to keep the claws of lobsters in each row holstered in bottom section 20 separated from those in adjacent rows to further minimize damage during shipment.

Intermediate section 60 contains the male portion 74 of an interlock which mates in a friction fit with a complementary female recession along the perimeter of the bottom portion of top section 80.

Although it is preferable to employ intermediate section 60, this section is optional. When present, it provides the aforementioned function of supporting the cooling means positioned within the cover section 80. During packing of container 10 with lobsters, the intermediate section is joined to the bottom section which greatly facilitates the packing of the lobsters without damaging their claws. After the container arrives at its destination, removal of top section 80 and intermediate section 60 provides easy access to lobsters contained in the lobster holsters in lower section 20 thereby facilitating removal of the lobsters from container 10.

As mentioned, intermediate section 60 is optional. For example, the reinforcing and cooling means support functions can be molded into lower section 20.

Top section 80 contains sufficient internal void volume to hold sufficient ice, refrigerated gel packs or other cooling means to chill lobsters contained in the holsters of bottom section 20 during storage and shipment. Top section 80 also contains the female component 82 of the stacking lug arrangement.

Prior to inserting the ice, refrigerated gel packs or other cooling means, it is sometimes preferable to add moisture media to container 10. This can be done conveniently by inserting such moisture media into the spaces in intermediate section 60 between the spaces created by wall members 62 and 64 and ribs 70 and 72. Suitable moisture media include wet or damp cloth material, newspaper, etc.

Figure 5:
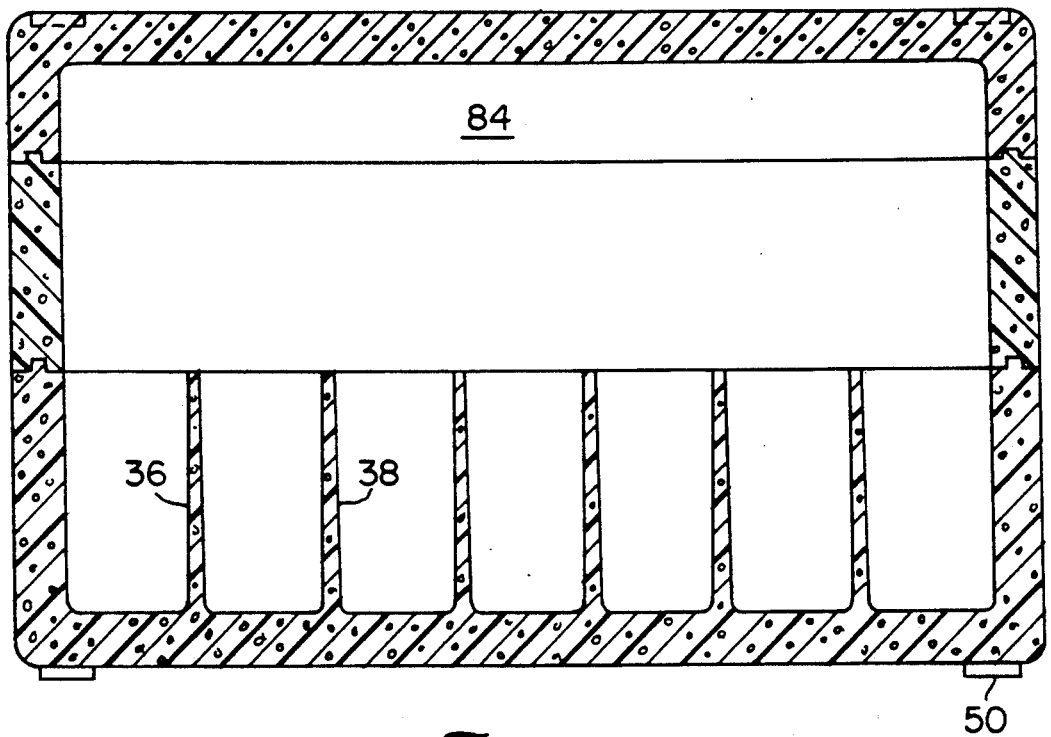
FIG. 5 is a sectional view taken lengthwise at the midline of the container.
Figure 6:
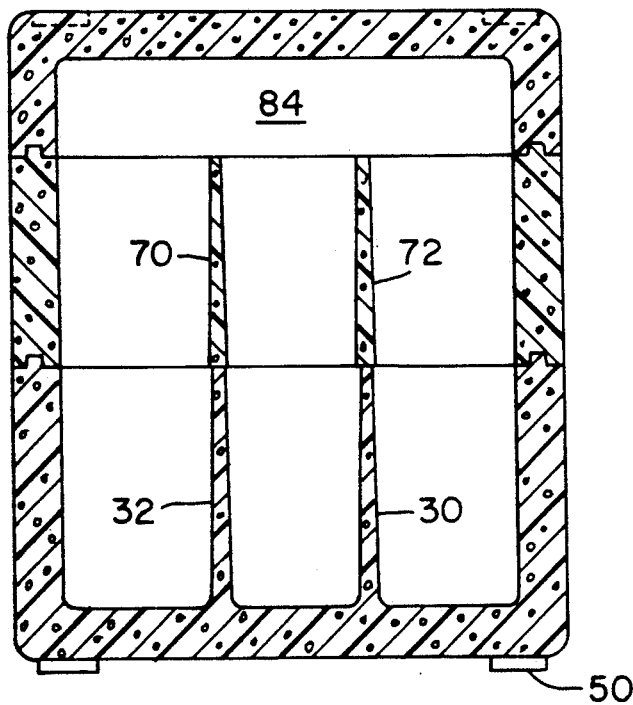
FIG. 6 is a sectional view taken across it at the midline of the container.

The internal structure of container 10, in an assembled mode, can be seen in the cross-sectional views of FIG. 5 and FIG. 6. As mentioned previously, ice, refrigerated gel packs or other cooling means is inserted within the void volume 84 provided within upper section 80. Ribs 70 and 72 of intermediate section 60 provide support for such ice or refrigerator gel packs so that the weight does not bear on lobsters positioned within the lower section 20 and intermediate section 60.

EQUIVALENTS

Those skilled in the art will recognize, or be able to ascertain using no more than routine experimentation, many equivalents to the specific embodiments of the invention described herein. These and all other equivalents are intended to be encompassed by the following claims.

I claim:

1. A storage and/or shipment container for live lobsters, comprising:
   a. a bottom section having therein a plurality of lobster holsters, each of said lobster holsters being suitable for containing the body and tail of a single lobster in a manner which supports the claws of the lobster at the Merus section;
   b. an upper cover section having an interior void volume suitable for containing a cooling means for lobsters contained in the holsters within the bottom section of the container; and,
   c. an intermediate section having means therein for supporting cooling means for lobsters contained within the upper cover section of the container,
   the bottom, upper and intermediate sections of said container being formed from a thermally insulating material and having means for joining them together into an integral storage and/or shipment container for live lobsters.

2. A container of claim 1 wherein the bottom section is rectangular in shape.

3. A container of claim 2 wherein the lobster holsters within the bottom section are formed from a series of parallel internal walls running the length and width of said bottom section.

4. A container of claim 3 wherein the bottom section is molded as a unitary structure.

5. A container of claim 4 wherein the means for supporting cooling means for lobsters contained in the holsters within the bottom section of the container comprise parallel rib members running in the lengthwise direction within the intermediate section.

6. A container of claim 5 wherein the intermediate section is a molded unitary structure.

7. A container of claim 6 wherein the upper section is a molded unitary structure.

8. A container of claim 7 wherein each of the bottom, upper and intermediate sections is formed from a foamed polymer.

9. A container of claim 8 wherein said polymer comprises foamed polystyrene.

10. A container of claim 9 wherein said means for joining comprise raised male locking sections at the upper perimeters of the bottom and intermediate sections and complementary female recesses for said male members on the bottom perimeters of said intermediate and upper cover sections.

11. A container of claim 10 containing male locating lugs on the bottom section thereof and complementary female locating recessions on the upper surface of the cover section.

12. A storage and/or shipment container for live lobsters comprising a bottom section having its internal volume segregated into a plurality of lobster holsters for containing the body and tail of a single lobster and an upper cover portion having an interior void volume suitable for containing a cooling means for lobsters contained in holsters within the bottom section of the container, the bottom and upper sections of said container being formed of a thermally insulating material and having means for joining them together into an integral storage and/or shipment container for live lobster, said lobster holsters supporting the claws of the lobsters at the Merus sections in said integral storage and/or shipment container.

13. A method for packaging live lobsters for shipment, comprising the steps of:
a. providing a shipment container comprising a bottom section having therein a plurality of lobster holsters, each of said lobster holders being suitable for containing the body and tail of a single lobster in a manner which supports the claws of the lobster at the Merus section, an upper cover section having an interior void volume suitable for containing a cooling means for lobsters contained in the holsters within the bottom section of the container and an intermediate section having means therein for supporting cooling means for lobsters contained within the upper cover section of the container, the bottom, upper and intermediate sections of said container being formed from a thermally insulating material and having means for joining them together into an integral storage and shipment container for lobsters;
b. joining the intermediate section of said container to the bottom section;
c. introducing lobsters into at least some of the lobster holsters contained in the bottom section of said container;
d. adding cooling means on the top of said intermediate section; and
e. joining the cover section to the intermediate section.

14. A method of claim 13 including the step of inserting moisture media between the lobsters and cooling means.

15. A method of claim 14 wherein said moisture media comprises wet newspaper.

* * * * *